United States Patent
Patel et al.

(10) Patent No.: US 10,425,819 B2
(45) Date of Patent: Sep. 24, 2019

(54) APPARATUS AND METHOD FOR CONTROLLING OUTBOUND COMMUNICATION

(71) Applicant: Samsung Electronics Co., Ltd., Suwon-si, Gyeonggi-do (KR)

(72) Inventors: Kunal Patel, Mountain View, CA (US); John S. Morrison, Mountain View, CA (US); Robert L. Harrison, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 15/260,975

(22) Filed: Sep. 9, 2016

(65) Prior Publication Data
US 2017/0086127 A1     Mar. 23, 2017

Related U.S. Application Data

(60) Provisional application No. 62/220,160, filed on Sep. 17, 2015.

(51) Int. Cl.
| | |
|---|---|
| *H04M 3/16* | (2006.01) |
| *H04W 12/08* | (2009.01) |
| *G06F 21/50* | (2013.01) |
| *H04W 88/02* | (2009.01) |
| *H04W 12/12* | (2009.01) |

(52) U.S. Cl.
CPC ............ *H04W 12/08* (2013.01); *G06F 21/50* (2013.01); *H04W 12/12* (2013.01); *H04W 88/02* (2013.01)

(58) Field of Classification Search
CPC ...... H04L 63/08; H04W 12/06; H04W 12/08; H04W 12/12; H04W 88/02
See application file for complete search history.

(56) References Cited

U.S. PATENT DOCUMENTS

| | | | | |
|---|---|---|---|---|
| 5,896,497 A * | 4/1999 | Halstead | ............... | G06F 21/313 726/35 |
| 6,556,819 B2 * | 4/2003 | Irvin | ....................... | H04W 4/02 455/410 |
| 8,788,804 B2 | 7/2014 | Nagaraja | | |
| 8,971,927 B2 * | 3/2015 | Zhou | ..................... | H04W 48/04 455/414.2 |
| 8,989,792 B1 * | 3/2015 | Depew | ................. | H04B 1/3838 455/117 |
| 9,027,076 B2 | 5/2015 | Roach et al. | | |
| 2003/0208606 A1 * | 11/2003 | Maguire | ............... | G06F 21/554 709/227 |
| 2008/0096505 A1 * | 4/2008 | Martinez | ........... | H04M 1/72522 455/187.1 |
| 2010/0159908 A1 * | 6/2010 | Chang | ............... | H04M 1/72569 455/418 |

(Continued)

*Primary Examiner* — Shantell L Heiber
(74) *Attorney, Agent, or Firm* — Jefferson IP Law, LLP

(57) ABSTRACT

A mobile device is provided. The mobile device includes an activity sensor for generating data, a channel controller configured to determine the user presence based on the data obtained through the activity sensor, and a communication interface for communicating with an external network. The channel controller is configured to block or disable the communication between a source on the mobile device and the external network when the channel controller determines a lack of the user presence for a predetermined time.

18 Claims, 3 Drawing Sheets

(56) References Cited

U.S. PATENT DOCUMENTS

| | | | | |
|---|---|---|---|---|
| 2012/0287035 A1* | 11/2012 | Valko | .................... | G06F 1/3231 345/156 |
| 2013/0316686 A1* | 11/2013 | Subbaramoo | ........... | H04W 8/22 455/418 |
| 2014/0018033 A1* | 1/2014 | Luna | ................. | H04W 28/0215 455/405 |

* cited by examiner

APPARATUS AND METHOD FOR CONTROLLING OUTBOUND COMMUNICATION

CROSS-REFERENCE TO RELATED APPLICATION(S)

This application claims the benefit under 35 U.S.C. § 119(e) of a U.S. Provisional application filed on Sep. 17, 2015, in the U.S. Patent and Trademark Office and assigned Ser. No. 62/220,160, the entire disclosure of which is hereby incorporated by reference.

TECHNICAL FIELD

The present disclosure relates to an apparatus and method for controlling an outbound communication channel. More particularly, the present disclosure relates to an apparatus and method for blocking or disabling access to interactive push features of a mobile device when the user is not present.

BACKGROUND

Mobile terminals such as smart phones and tablets are developed to provide wireless communication between users. As technology has advanced, mobile terminals now provide many additional features beyond simple telephone conversation. For example, mobile terminals are now able to provide additional functions such as an alarm, a short messaging service (SMS), a multimedia message service (MMS), e-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

However, the proliferation of smart phones and tablets is also attracting hackers. Hackers have demonstrated the ability to remotely access smart phones and tablets. Malicious entry onto the platform can be gained in a variety of ways, including app updates. There is possibility that interactive processes in use when the user is not actively using the phone could be the result of malicious, unintended, or unauthorized action.

Accordingly, there is a need for an apparatus and method for blocking unintended or malicious use of the device when the user is not present.

SUMMARY

Aspects of the present disclosure are to address at least the above-mentioned problems and/or disadvantages and to provide at least the advantages described below. Accordingly, an aspect of the present disclosure is to provide an apparatus and method for blocking or disabling a mobile device "push features" from a push source over an external network if there is no evidence of user presence.

In accordance with an aspect of the present disclosure, a mobile device is provided. The mobile device includes an activity sensor for generating data, a channel controller configured to determine the user presence based on the data obtained through the activity sensor, and a communication interface for communicating with an external network. The channel controller is configured to block or disable the communication between a source on the mobile device and the external network when the channel controller determines a lack of the user presence for a predetermined time.

In accordance with another aspect of the present disclosure, a method of a mobile device is provided. The method includes generating, by an activity sensor, data, determining, by a channel controller, the user presence or absence based on the data obtained through the activity sensor, communicating with an external network over a communication interface, and blocking or disabling, by the channel controller, the communication between a source of the mobile device and the external network when the channel controller determines a lack of the user presence for a predetermined time.

In accordance with another aspect of the present disclosure, a non-transitory computer-readable storage medium with an executable program stored thereon is provided. The program when executed by a processor controls an activity sensor to generate data, controls a channel controller to determine the user presence or absence based on the data obtained through the activity sensor, controls a communication with an external network over a communication interface, and controls the channel controller to block or disable the communication between a source of the mobile device and the external network when a lack of the user presence is determined for a predetermined time in the operation of the controlling of by the channel controller.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
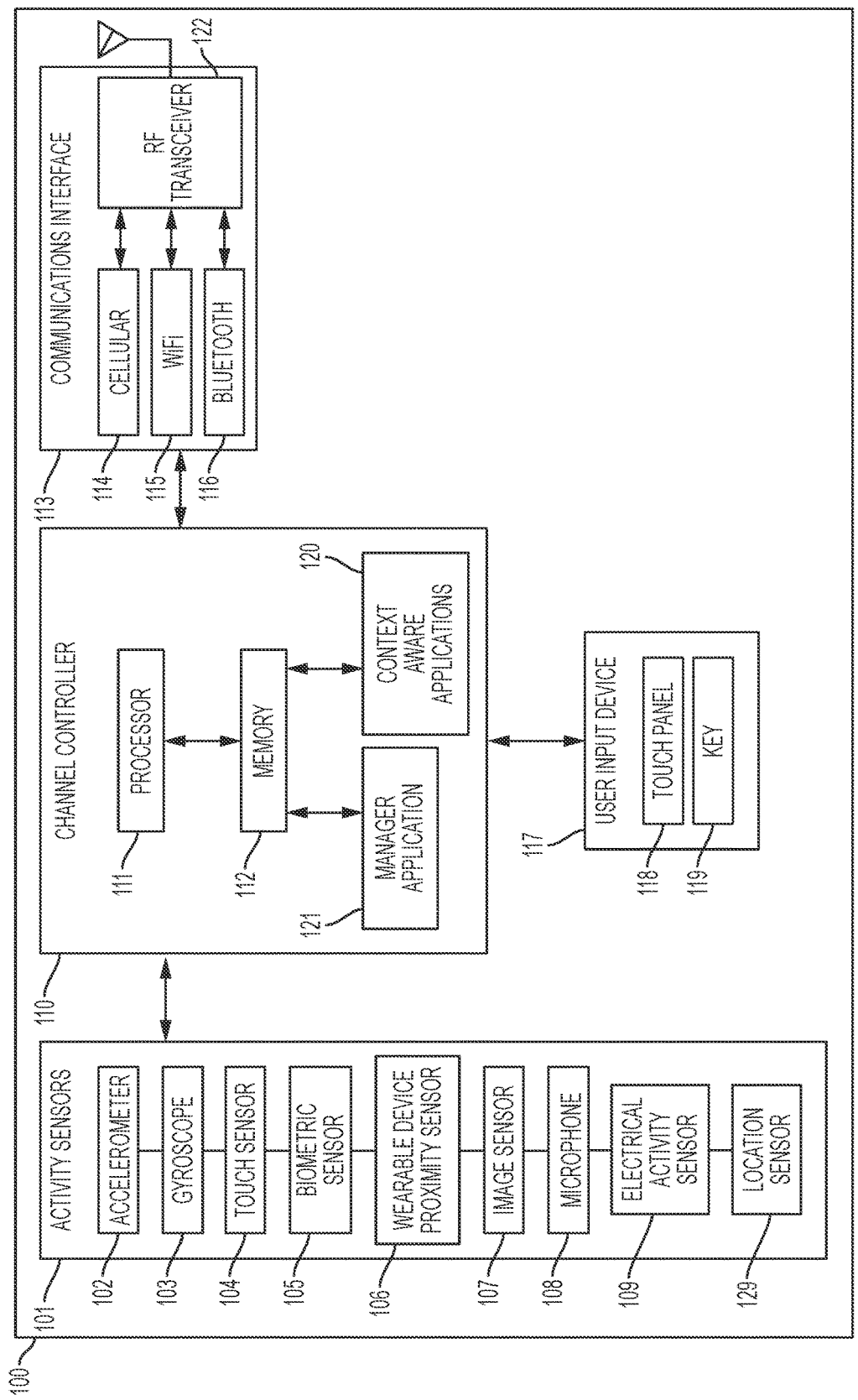
FIG. 1 illustrates a block diagram of a mobile device according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in the understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, a mobile device may include communication functionality. For example, a mobile device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch, and/or the like.

According to various embodiments of the present disclosure, a mobile device may be any combination of the foregoing devices. In addition, it will be apparent to one having ordinary skill in the art that a mobile device according to various embodiments of the present disclosure is not limited to the foregoing devices.

Various embodiments of the present disclosure include an apparatus and method for blocking or disabling access to interactive push features when there is no evidence that the user is present. A "push feature" is any software or hardware mediated function which connects to an external network and pushes data to it.

FIG. 1 illustrates a block diagram of a mobile device according to various embodiments of the present disclosure.

Referring to FIG. 1, a mobile device 100 may include activity sensors 101, a channel controller 110, a communications interface 113 and a user input device 117.

The activity sensors 101 may, for example, measure physical quantities or detect operational states associated with the mobile device 100, and convert the measured or detected information into electric signals. The activity sensors 101 may include accelerometer 102, gyroscope 103, touch sensor 104, biometric sensor 105, wearable device proximity sensor 106, image sensor 107, microphone 108 electrical activity sensor 109 and location sensor 129. The activity sensors 101 may further include a control circuit for controlling one or more sensors included therein. According to various embodiments, the mobile device 100 may further include a microprocessor configured to control the activity sensors 101, as a part of or separately from the channel controller 110. Thus, while the mobile device 100 is in a sleep state, the control circuit may control the activity sensors 101.

The accelerometer and gyroscope may sample information related to device movement, and device orientation for a pre-set period of time to determine the user presence. The touch sensor may sample information related to touch events such as drag motion events, swipe gestures, long press events and keyboard input to determine the user presence to determine the user presence. The biometric sensor may sample information related to biometric activity such as finger print, face and retinal scans and voice recognition etc. to determine the user presence. The wearable device proximity sensor may include a near field communication sensor such as an infrared sensor or a bluetooth sensor. The infrared sensor or the bluetooth sensor may determine the user presence based on device proximity to a wearable device for some adjustable period of time. The image sensor may include a camera and may sample information related to a images to determine the user presence. The microphone may sample information related to audio data. The electrical activity sensor may include galvanic sensor or an electro-cardiogram (EKG) monitor. The galvanic sensor may sample information related to unique activity such as galvanic skin response. The EKG monitor may sample heart's electrical activity. The location sensor 129 may include a global positioning system (GPS) device or a triangulation device that may provide location information such as GPS coordinates. The location sensor may sample information related to a location such as global positioning system coordinates to determine the user presence.

The channel controller 110 may include at least a processor 111, a memory 112, context aware applications 120 and manager application 121. The processor 111 may include one or more specialized microprocessors and/or a mobile application processor designed to support applications running in a mobile operating system environment. The memory 112 may store the applications running the mobile operating system environment.

The context aware applications 120 monitor login events, app activity and ignored notifications.

The channel controller 110 includes a logic for determining user presence and actuator for enabling or disabling an outbound communications interface 113 based on the information received from the activity sensors 101 and the information generated from the context aware applications 120 based on the rules provided by the manager application 121. The actuator may be an electrical switch such as a transistor switch or a soft switch implemented by way of software running on the processor.

The communications interface 113 may include, for example, a cellular interface 114, a wireless fidelity (Wi-Fi) interface 115, a Bluetooth (BT) interface 116 and a Radio Frequency (RF) transceiver 33. The RF transceiver 33 communicates with the cellular interface 114, the Wi-Fi interface 115, and the BT interface 116.

The cellular interface 114 may provide services such as voice call, video call, text messaging, or an Internet service through a communication network. According to an embodiment of the present disclosure, the cellular interface may perform at least a part of the functionalities of the processor 111.

The Wi-Fi and BT interfaces may be used to connect the mobile device to a communication network. The RF transceiver 33 may transmit and receive, for example, communication signals (for example, RF signals) to and from the cellular, BT and/or BT interfaces. The RF transceiver 33 may include, for example, a transmitter, a receiver, a power amplifier, a frequency filter, a low noise amplifier (LNA), an antenna, or the like.

Figure 2:
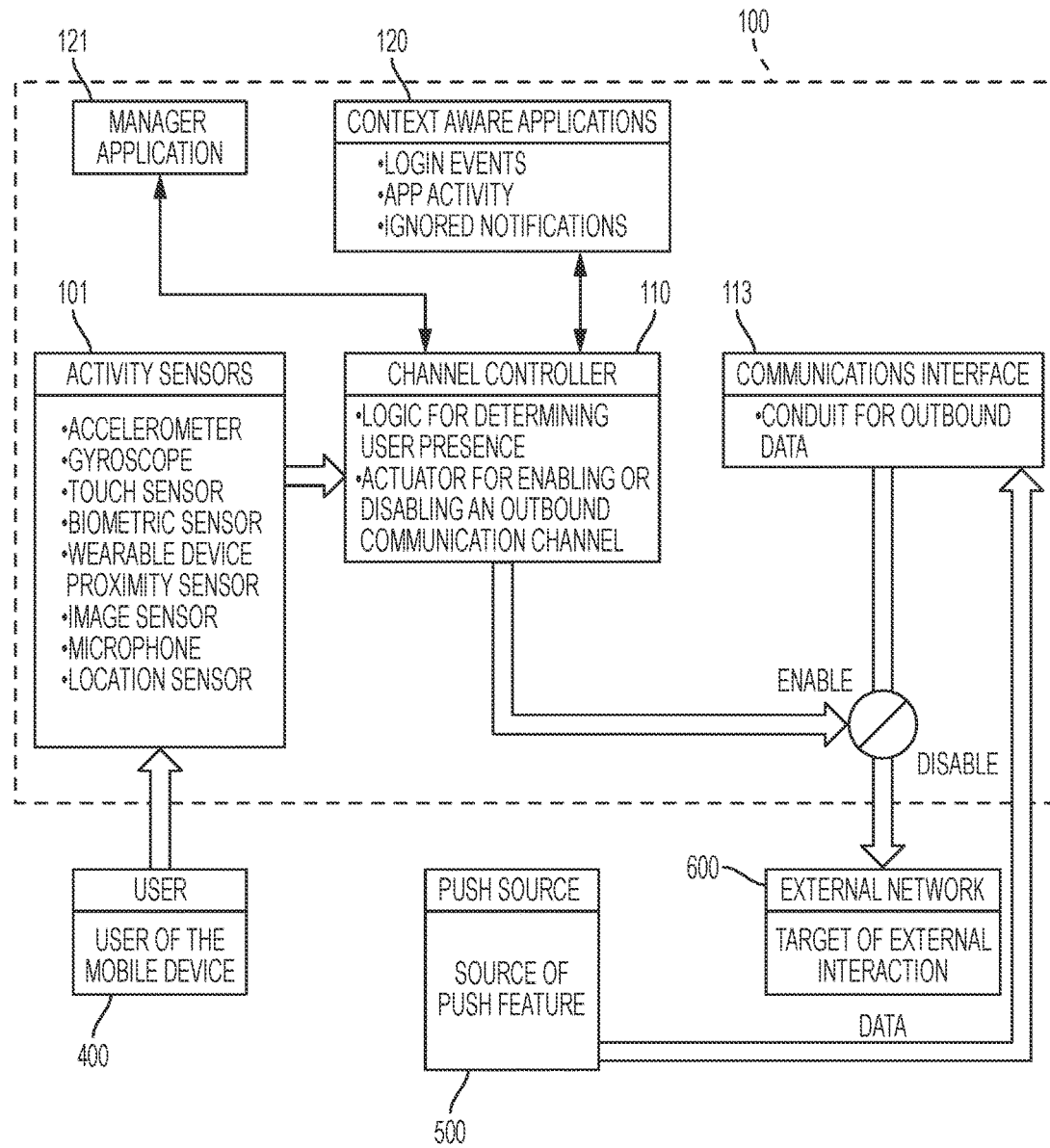
FIG. 2 illustrates a flow diagram for blocking or disabling a mobile device "push features" from a push source over an external network according to an embodiment of the present disclosure.

The communications interface 113 may transmit and receive data from an external network 600 (FIG. 2). The outbound communication from the communications interface 113 is enabled or disabled by the channel controller 110.

The input device 117 may include, for example, a touch panel 118, and/or a key 119. The touch panel 118 may operate in at least one of for example, capacitive, resistive, infrared, and ultrasonic schemes. The key 119 may include, for example, a physical button, a soft key, an optical key, or a keypad.

FIG. 2 is a flow diagram of a method of disabling a communications interface by a channel controller according to various embodiments of the present disclosure.

Referring to FIG. 2, the flow diagram of FIG. 2 shows a flow of signals between activity sensors 101, channel controller 110, communications interface 113 a user 400, a push source 500 and an external network 600.

According to FIG. 2, the activity sensors 101 monitor the user 400 of the mobile device and feeds data associated with the user's presence to the channel controller 110. For example, the activity sensors 101 may feed data associated with device movement, touch events or a display state of the display screen to indicate user presence or absence to the channel controller.

The context aware applications 120 running on the channel controller 110 may monitor login events, app activity and ignored notifications by the user. For example, a device unlock event is highly indicative of user presence; whereas, a pop-up notification that has been ignored by the user for an extended period of time is highly indicative of user absence.

If the channel controller fails to detect user activity for a period of time, the period adjustable or set by the manager application 121, based on the data from the activity sensors 101 and context aware applications 120, the channel controller 110 disables a communication between the push source 500 and an external network 600. The disabling of the communication between the push source 500 and an external network 600 may be by way of disabling or blocking the outbound communications channel of a data plane.

Figure 3:
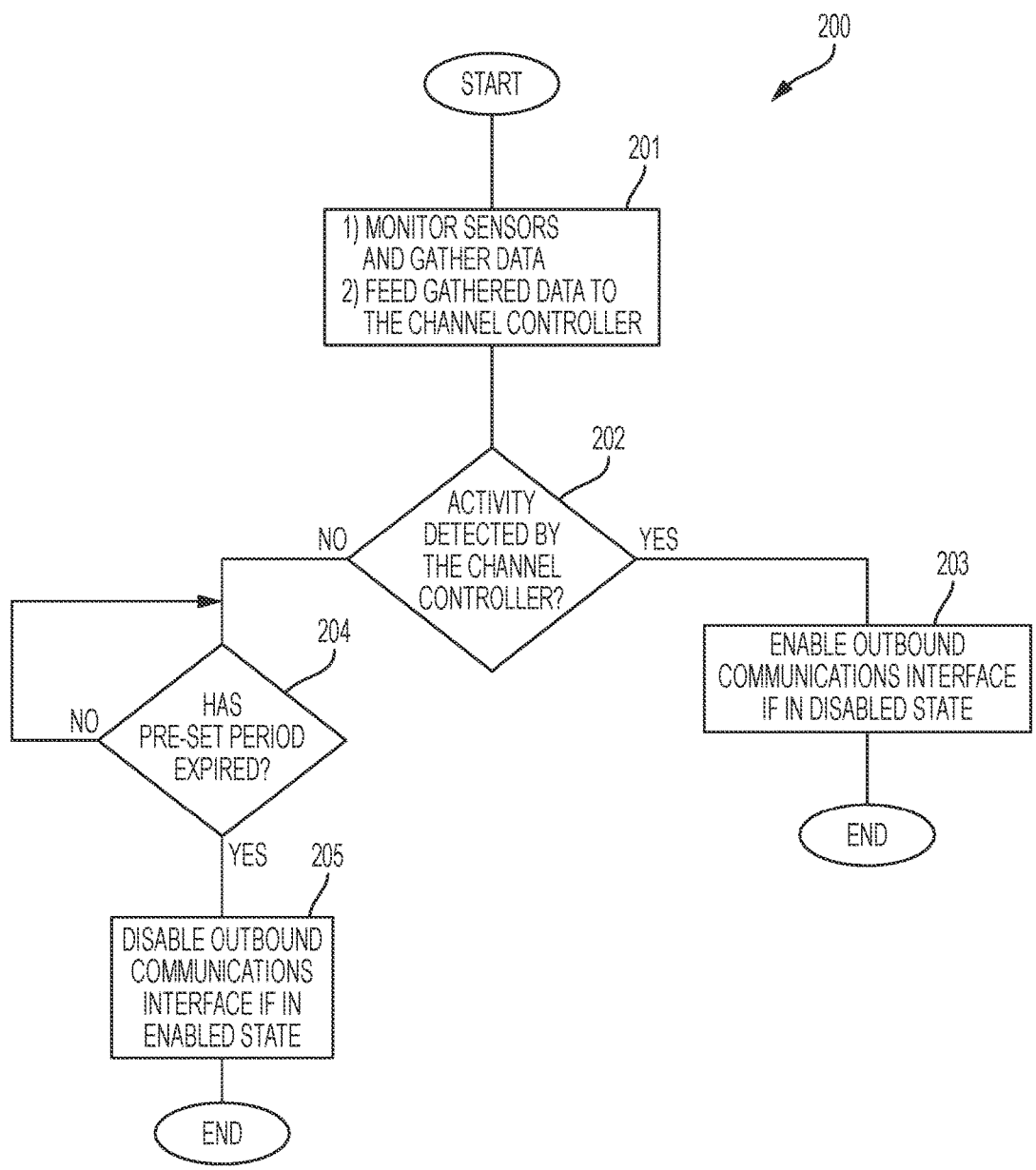
FIG. 3 illustrates a flow chart of a method enabling or disabling an outbound communications interface according to an embodiment of the present disclosure.

FIG. 3 is a flowchart of a method for enabling or disabling an outbound communications interface according to various embodiments of the present disclosure.

Referring to FIG. 3, a flowchart 200 illustrates a method of disabling an outbound communications interface in order to block or disable access to interactive push features when there is no evidence that a user is present. This prevents the unintended or malicious use of the mobile device when the user is not present.

In particular, at operation 201, the channel controller 110 may collect information from activity sensors 101 and context aware applications 120. The information from the activity sensors 101 may include device information regarding device movement, touch events, and display state. For example, the display state where the display screen is off and no sound is being played is highly indicative of user absence. The information from context aware applications may include login events, app activity and ignored notifications. For example, a device unlock event can be highly indicative of user presence; whereas, a pop-up notification that has been ignored for an extended period of time may be highly indicative of user absence.

Next, based on the information collected from the activity sensors 101 and context aware applications 120, the channel controller 110 may build a model to output a likelihood of user's presence. The underlying model abstraction may be defined by function:

$$\text{presence} = f(\text{input}; \text{parameters}) \quad \quad \text{Equation 1}$$

Where presence represents the likelihood of user presence, parameters represents the vector of model parameters that, when combined with f, completely define the presence calculation, and input represents the vector of sensor information.

In the case of a linear model, presence may be a vector of scalar values ranging from infinity to infinity, parameters may contain the coefficients of each input variable, and input may be a vector of probabilities.

According to an embodiment of the present disclosure, a model may be based on disjunction of step functions, in which the presence function f is the maximum of a set of step functions parameterized by thresholds. In this scenario, the device compares the input, for example the time elapsed since the last device unlock event, to the threshold value. If the input value is greater than the threshold, user presence is considered likely. Otherwise, user presence is considered unlikely.

According to an embodiment of the present disclosure, a model may be based on a neural network, in which the presence function f is a neural network parameterized by weights. As an example, the inputs are all converted to numerical values, and they are converted as follows to a presence score:

$$\text{hidden}_{1_i} = \text{sigmoid}(\Sigma \text{input}_i * \text{weight}_{1_i}) \quad \quad \text{Equation 2}$$

$$\text{hidden}_{2_i} = \text{sigmoid}(\Sigma \text{hidden}_{1_i} * \text{weight}_{2_i}) \quad \quad \text{Equation 3}$$

$$\text{risk} = \text{sigmoid}(\Sigma \text{hidden}_{2_i} * \text{weight}_{3_i}) \quad \quad \text{Equation 4}$$

If the output presence score is close to one in the model based on the neural network, user presence is considered likely. Otherwise, user presence is considered unlikely.

According to an embodiment of the present disclosure, a model may be based on a decision tree, in which the presence function f is a decision tree parameterized by: (1) the hierarchy of decisions; (2) the parameters required for each individual decision; and (3) the presence score output by each leaf of the decision tree.

In this scenario, the device computes a series of Boolean values based on the input. For example, the first decision may be to determine whether or not the user has interacted with the device touch screen recently, as determined by some threshold duration, the result is true, then the second decision may be to determine whether or not the display screen was just recently turned on; otherwise, the second decision may be to determine whether or not a video is currently playing. This continues until a decision outputs whether or not user presence is likely.

According to an embodiment of the present disclosure, a model may be based on making input features usable. All of the above models require input features to be in a numerical format consisting of a vector of scalar values. Not all input signals useful for determining user presence will be naturally available in this format. For these signals, there must be some process to convert the signals into a vector of scalar values. Two examples of such processes are described below.

Example Process 1: Distributions

Input signals occasionally come in the form of a distribution. For example, it is generally not possible to get the precise location of a user's device. Such requests for the location of a users device will often return several possible locations, each with their own level of accuracy. The multiple possible locations and accuracies represent a distribution over the possible locations.

Distributions can be converted to scalar numerical values through a weighted integral.

$$\text{precision} = |\int (\vec{x}-\bar{x})^2 p(\vec{x}) d\vec{x}|_2 \qquad \text{Equation 5}$$

The above equation will yield a scalar value that can be used to determine whether the provided device location is sufficiently accurate. This value may be provided to a decision tree. If the value exceeds some threshold, then the decision tree would not attempt to make use of the location value to determine user presence. If the value is below the threshold, the decision tree would use location to determine use presence.

Example Process 2: Time Series

Some input signals are a sequence of values. For example, drag motion events detected by touch screen sensors will appear as a series of touch screen coordinated. These events are often meaningless on their own, but they can be made meaningful in aggregate. Algorithms such as dynamic time warping can be used to determine how similar such sequences are to certain sequences that are known to be meaningful.

Example input events known to be meaningful are swipe gestures, long-press events, and keyboard input of known common words.

Training the Model

All of the provided example models may make use of additional data that is used to initialize the model and to iteratively improve the model over time. This data is referred to as the ground truth. In order to build an accurate model, the ground truth must be reliable.

For the purposes of constructing the ground truth, some input features are specially marked as highly reliable and indicative of user presence. For example, a device unlock event is highly indicative of user presence. A pop-up notification that has been ignored for an extended period of time is highly indicative of user absence. The display screen being off and no sound being played is highly indicative of user absence.

Data that is not ground truth can optionally be used to train each respective model to correlate input features in order to subsequently make optimal use of the limited ground truth data. Ground truth data is then use to train the model to determine user presence or absence. The method of training a model is highly specific to each model.

Returning to FIG. 2 at operation 202, the channel controller 110 processes data and determines whether user activity is detected. If the channel controller 110 determines that the user activity is detected at operation 202 (YES), then the operation moves to 203. At operation 203, the channel controller 110 enables the outbound communications interface 113 if it is in disabled state.

If the channel controller 110 determines that the user activity is not detected at operation 202 (NO), then the operation moves to 204. At operation 204, the channel controller 110 determines whether a pre-set period has expired. If the pre-set period has expired, that is, the channel controller 110 has failed to detect user activity in the pre-set time, the operation moves to 205. At operation 205, the channel controller 110 disables (blocks) the outbound communications interface if the outbound communications interface is in enabled state.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are not intended to limit the scope of the present disclosure. Accordingly, the scope of the present disclosure should be understood as to include any and all modifications that may be made without departing from the technical spirit of the present disclosure.

What is claimed is:

1. A mobile device, comprising:
    an activity sensor for generating data;
    a communication interface for communicating with an external network; and
    a channel controller configured to:
        obtain data generated by activity sensor,
        obtain data from one or more context aware applications running on the mobile device,
        build a model for a likelihood of the user presence based on the data obtained through the activity sensor and from the one or more context aware applications, and
        block a push feature of the mobile device to prevent an outbound communication from a push source of the mobile device to the external network when the user presence is unlikely according to the model,
    wherein the push feature comprises software or hardware mediated function for pushing data to the external network.

2. The mobile device of claim 1, wherein the channel controller is further configured to calculate a presence score based on the model.

3. The mobile device of claim 2, wherein the channel controller is further configured to confirm the user presence when the presence score is greater than a predetermined threshold value.

4. The mobile device of claim 3, wherein the presence score is a value less than or equal to one.

5. The mobile device of claim 1, wherein the data from the one or more context aware applications comprises information associated with a state of the mobile device.

6. The mobile device of claim 1, wherein the data from the one or more context aware applications comprises user interaction information.

7. The mobile device of claim 1,
wherein the communication between the push source and the external network is prevented by disabling the function that pushes data to the external network.

8. The mobile device of claim 1, wherein the activity sensor comprises at least one of an accelerometer, a gyroscope, a touch sensor, a biometric sensor, an image sensor, a microphone or a location sensor.

9. The mobile device of claim 8, wherein the user presence is determined by multiple correlated factors including accelerometer activity, gyroscopic activity, proximity to a uniquely identifiable wearable device, touch, analysis of unique electrical activity and unique biometric user signatures.

10. A method of a mobile device, the method comprising:
generating, by an activity sensor, data;
communicating with an external network over a communication interface;
obtaining data from one or more context aware applications running on the mobile device;
building, by a channel controller, a model for a likelihood of the user presence based on the data generated by the activity sensor and obtained from the one or more context aware applications; and
blocking, by the channel controller, a push feature of the mobile device to prevent an outbound communication from a push source of the mobile device to the external network when the user presence is unlikely according to the model,
wherein the push feature comprises software or hardware mediated function for pushing data to the external network.

11. The method of claim 10, further comprising:
calculating a presence score based on the model.

12. The method of claim 11, further comprising:
confirming the user presence when the presence score is greater than a predetermined threshold value.

13. The method of claim 12,
wherein the presence score is a value less than or equal to one.

14. The method of claim 10,
wherein the data from the one or more context aware applications comprises information associated with a state of the mobile device.

15. The method of claim 10,
wherein the data from the one or more context aware applications comprises user interaction information.

16. The mobile device of claim 10,
wherein the communication between the push source and the external network is prevented by disabling the function that pushes data to the external network.

17. The mobile device of claim 10, wherein the activity sensor comprises at least one of an accelerometer, a gyroscope, a touch sensor, a biometric sensor, a wearable device proximity sensor, an image sensor, a microphone, an electrical activity sensor or a location sensor.

18. A non-transitory computer-readable storage medium with an executable program stored thereon, wherein the program when executed by a processor performs the following operations:
controlling an activity sensor to generate data;
controlling a communication with an external network over a communication interface;
obtaining data from one or more context aware applications running on the mobile device;
building, by the channel controller, a model for a likelihood of the user presence based on the data generated by the activity sensor and obtained from the context aware applications; and
controlling the channel controller to block a push feature of the mobile device to prevent an outbound communication from a push source of the mobile device to the external network when the user presence is unlikely according to the model in the operation of the controlling of the channel controller,
wherein the push feature comprises software or hardware mediated function for pushing data to the external network.

* * * * *